May 23, 1967 R. L. COPSON ET AL 3,321,268
CONVERSION OF CAUSTIC SODA TO SODA ASH
Filed Sept. 25, 1963
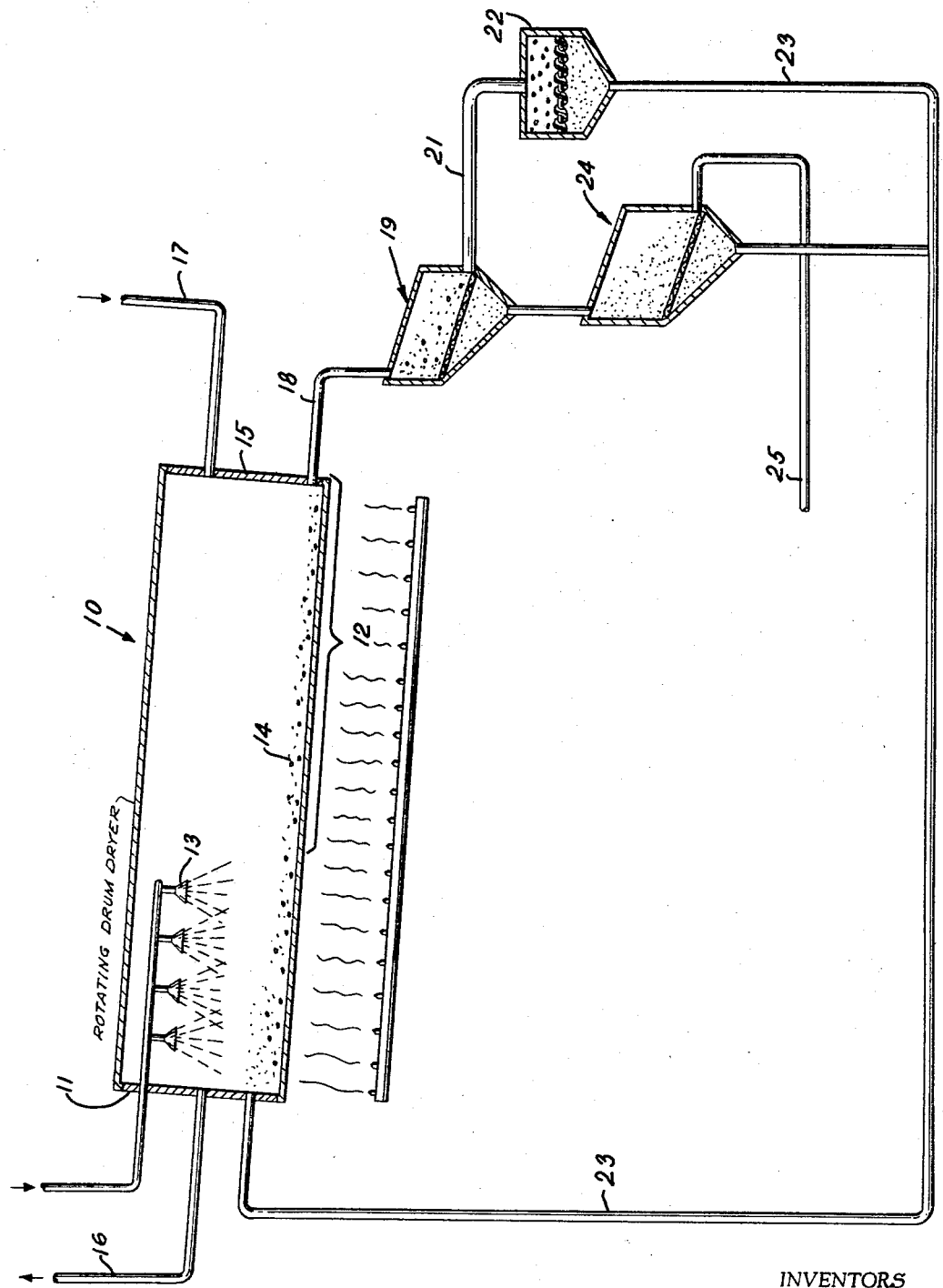
INVENTORS
RAYMOND L. COPSON
CARLTON J. HOWARD
CLARENCE F. HECKLINGER
BY
*Benjamin Sweedler*
ATTORNEY 3,321,268
CONVERSION OF CAUSTIC SODA TO SODA ASH
Raymond L. Copson, Syracuse, Carlton J. Howard, Salina, and Clarence F. Hecklinger, Camillus, N.Y., assignors to Allied Chemical Corporation, New York, N.Y., a corporation of New York
Filed Sept. 25, 1963, Ser. No. 311,411
6 Claims. (Cl. 23—63)

This invention relates to the production of sodium carbonate from the sodium hydroxide produced in the manufacture of chlorine by electrolytic cell techniques.

The conversion of sodium hydroxide produced in the electrolysis of sodium chloride brines to a more readily saleable form, namely, sodium carbonate, has been the subject of extensive research for at least the past ten years. Various methods have been proposed involving the well known reaction of sodium hydroxide with $CO_2$ to produce sodium bicarbonate or sodium carbonate. These methods include carbonation of solutions of sodium hydroxide to effect crystallization of sodium carbonate monohydrate or sodium bicarbonate followed by calcination to anhydrous sodium carbonate; spray drying the sodium hydroxide solution in a hot $CO_2$ atmosphere resulting in the production of low density sodium carbonate (bulk densities of from 465 to about 700 grams per liter (g.p.l.)) and containing appreciable amounts of sodium hydroxide impurity; and the introduction of the solution of sodium hydroxide in a fluid bed of sodium carbonate in which combustion gases are employed as the fluidizing medium. These procedures have a number of disadvantages, among which are: (1) they require relatively involved costly equipment requiring large capital expenditures for their practice; (2) the operation of such equipment is involved and complicated; (3) they result in an inferior soda ash, in many cases of low density and having an objectionable high content of dust and/or fines.

It is a principal object of this invention to provide a process of converting sodium hydroxide to sodium carbonate, which process can be carried out in relatively simple equipment requiring less capital expenditure than that employed for procedures heretofore proposed for effecting such conversion, the conduct of which process is comparatively simple and which process results in a dense soda ash product of relatively high bulk density, having good abrasion resistance, good flow quality characteristics and suitable for use in the glass and other industries employing dense soda ash.

Other objects and advantages of this invention will be apparent from the following detailed description thereof.

In accordance with this invention sodium hydroxide solutions such, for example, as mercury cell sodium hydroxide solutions as produced containing about 50% by weight of sodium hydroxide or diaphragm cell sodium hydroxide solutions concentrated to contain from 30% to 70% sodium hydroxide, are fed onto a moving bed of particles of soda ash maintained at a temperature of from 90° C. to 135° C., preferably 115° C. to 125° C., at least in the feed end where the sodium hydroxide solution is introduced onto the moving bed, while passing over this bed carbon dioxide in amount at least equal to the stoichiometric equivalent of the sodium hydroxide introduced onto the bed. The sodium hydroxide solution or liquor can be sprayed or otherwise fed (for example, in the form of relatively large droplets, of about 1 to 3 mm. diameter) onto the inlet end of the bed (i.e., the end where the bed of particles of sodium carbonate is initially formed). The bed of soda ash thus formed with the sodium hydroxide solution thereon moves continuously while the bed is heated to maintain a temperature within the aforesaid range of 90° C. to 135° C. The entire length of the bed, including the portion of the bed in the finishing zone, can, if desired, be heated to a temperature of from 90° C. to 135° C., preferably 115° C. to 125° C. However, to speed up the conversion of the caustic soda to soda ash, from the caustic addition zone, the soda ash particles containing adsorbed caustic soda are passed through a finishing zone to complete the carbonation of the caustic soda which finishing zone is maintained at a higher temperature, preferably within the range of 160° C. to 190° C. at the exit end thereof. Desirably this finishing zone is so heated as to maintain progressively increasing temperatures therein, in the direction of flow of the bed of soda ash particles containing adsorbed caustic soda therethrough, from about 125° C. to 135° C. at the inlet end thereof to 160° C. to 190° C. at the exit end.

The finishing zone is dimensioned to provide a residence time therein of from about 15 to about 30 minutes.

The bed containing the sodium carbonate thus produced is continuously discharged. Desirably the entire bed, including the sodium carbonate produced from the sodium hydroxide sprayed thereon, is passed to a screen to remove oversized particles (those not passing through about a 20 mesh screen). The soda ash particles of the desired screen size, i.e., those passing through 20 and retained on about 200 mesh, are removed as product and the smaller particles, chiefly those passing through 200 mesh, are recycled to form the moving bed of soda ash on which the sodium hydroxide solution is sprayed. Some small particles, up to about 30% and preferably up to about 15% of minus 100 mesh material can be tolerated in the product.

Desirably the moving bed of soda ash particles is formed as a rotating bed on the interior of a rotating drum heated internally or externally to maintain the bed at the aforesaid temperature. The bed thus formed is a relatively thin bed; it can have a thickness of about two inches or more. Rotation of the drum effects rotation of the bed and also longitudinal movement of the bed along the interior of the drum, the latter being suitably pitched for this purpose. The rate of rotation is selected to give the desired longitudinal feed rate of the bed, which will depend on the diameter of the drum, its length, the desired capacity, the rate of feed of the sodium hydroxide solution, its concentration and the temperature and volume of $CO_2$ containing gas passed through the drum. A peripheral drum speed of about 125 lineal feet per minute gives satisfactory operation.

Preferably the carbon dioxide-containing gas stream is introduced at the end of the drum from which the moving bed containing sodium carbonate formed by conversion of the sodium hydroxide to sodium carbonate is withdrawn, i.e., from the end of the finishing zone. Thus the carbon dioxide-containing stream flows through the drum countercurrent to the direction of movement of the bed. The exit gas containing any unreacted carbon dioxide, water vapor, and air, if used, is discharged from the inlet end of the drum.

The sodium hydroxide solution, as noted, can be the 50% sodium hydroxide produced as mercury cell liquor. This liquor is usually relatively free of impurities and can be sprayed directly onto the moving bed of soda ash. In the case of diaphragm cell sodium hydroxide liquors, which are relatively dilute and contain impurities, chiefly sodium chloride and iron which would contaminate the soda ash product, such liquors are first subjected to concentration and purification, e.g., filtration to remove sodium chloride and iron and produce the sodium hydroxide solution sprayed onto the moving bed. Desirably this solution should have a concentration of from 30% to 70% by weight of sodium hydroxide, preferably about 50%.

The soda ash used to form the moving bed, at least when starting up, can be the soda ash of commerce, either the so-called light soda ash having a density of from 500 to 600 g.p.l., or the so-called dense soda ash, i.e., having a density in excess of about 900 g.p.l. When starting up and the sodium carbonate initially produced is not of the desired density, the sodium carbonate produced is recycled until soda ash of the desired density is formed. In the process of this invention, under the disclosed temperature conditions and employing an amount of $CO_2$ at least equal to the stoichiometric amount required to convert the sodium hydroxide to sodium carbonate, anhydrous sodium carbonate builds up on the small particles of the moving bed and this is believed to be responsible for the formation of dense soda ash.

The particle size of the soda ash forming the bed is important in order to obtain the desired dense soda ash product. Particles of a size exceeding about 20 mesh should not be used. A typical mesh analysis of a product suitable for use in forming the bed is as follows: passing through 30 and retained on 80 mesh, from 10% to 15%; passing through 80 and retained on 100 mesh, from 5% to 15%; passing through 100 and retained on 200 mesh, from 40% to 50%; passing through 200 mesh, from 20% to 30%. All mesh sizes are standard U.S. screen series.

Once steady state operation is achieved the fine particles removed from the desired product are eminently satisfactory for producing the moving bed of soda ash; these fine particles are recycled to produce the moving bed.

The carbon dioxide used can be pure carbon dioxide or carbon dioxide formed by combustion of a suitable fuel such as relatively pure natural gas or other hydrocarbons. When using flue gas containing carbon dioxide, the gas is treated to remove the suspended material, sulfur dioxide and hydrogen sulfide before passage over the moving bed of soda ash to avoid contaminating the product.

The maintenance of the moving bed at a temperature within the range of 90° C. to 135° C. in the zone where the caustic soda is introduced is important because this temperature range is necessary to deposit anhydrous sodium carbonate on the small particles of soda ash forming the moving bed with consequent formation of an anhydrous or dense soda ash product. When the bed temperature is below 90° C. products result having low densities and operating difficulties occur chiefly because of too much dampness in the bed interfering with the desired smooth flow thereof. Temperatures above 135° C. tend to promote the formation of dust, i.e., material having a particle size below 200 mesh. By operating under the conditions herein disclosed an anhydrous soda ash product results, the individual particles of which are crystalline agglomerates of high density with good flow quality and relatively dust-free.

As noted, at least the stoichiometric amount of carbon dioxide to react with the sodium hydroxide to form sodium carbonate should be used. The use of less than a stoichiometric amount results in (1) a loss of sodium carbonate product, (2) a product containing sodium hydroxide impurity, and (3) interferes with the satisfactory operation of the moving bed in that the bed tends to become damp and sticky and to adhere to the shell of the drum on which the bed is formed and over which the bed passes.

Air in the carbon dioxide containing stream is helpful in controlling the particle size distribution; the presence of air tends to minimize the formation of lumps and results in the production of a product having a smaller average particle size without the production of fines and without adversely affecting the density of the product. Instead of air, an inert gas such as nitrogen can be used. In general, a carbon dioxide stream containing from 10% to 90% by volume of air or inert gas and from 90% to 10% by volume of carbon dioxide can be used.

The rate of feed of the sodium hydroxide solution will, of course, depend on the particular equipment used, i.e., its capacity, the temperature conditions at which the bed is maintained within the aforesaid range and, of course, should be correlated to the rate of feed of the carbon dioxide containing stream. In general, a feed of from 10 to 20 pounds of 50% sodium hydroxide solution per hour per cubic foot of volume of the drum in which the moving bed flows will give good results when employing a stream containing from 10% to 100% $CO_2$ at a temperature of from 20° C. up to 250° C. In general the higher the temperature of the $CO_2$ containing gas, the better and the less heat need be supplied to maintain the moving bed at the disclosed temperature.

The accompanying drawing is a flow sheet illustrating a preferred arrangement of the equipment for practicing the process of this invention.

In this drawing, 10 is a rotating drum dryer resistant to corrosion by alkali, e.g., metal such as stainless steel, suitably heated so that the walls thereof in the caustic soda feed zone are maintained at a temperature within the range of 90° C. to 135° C. at the inlet or feed end 11 and at a gradually increasing temperature in the finishing zone 12 up to a maximum temperature of about 190° C. at the exit end of the drum. At the inlet end 11 of this drum dryer 10, one or more inlets, e.g., sprays 13 are provided for feeding the sodium hydroxide solution onto the moving bed 14 of soda ash particles produced when steady state operation is reached by recycle through line 23 of the smaller particles of soda ash removed from the product stream taken off at the exit end 15 of this drum. The inlet end 11 is provided with a vent conduit 16 through which leaves the gas stream containing unreacted carbon dioxide, air or inert gas if used, and water vapor.

Carbon dioxide with or without air or inert gas is introduced at the exit end 15 through conduit 17. The moving bed of soda ash particles is discharged through line 18 and enters a scalping screen 19 where large particles, those having a size exceeding 14 to 20 mesh, are removed through line 21 which communicates with a grinder 22 for grinding these particles to the desired small size below 100 mesh for recycle through line 23 to form the moving bed 14 of soda ash. From the scalping screen 19 the particles passing through this screen enter a product screen 24. The particles retained on this screen 24 having a particle size such that only a small amount, e.g., 5 to 15%, can pass through a 100 mesh screen, are removed as product for packaging through line 25. The finer particles, those passing through the screen 24, are admixed with the particles from the grinder 22 flowing through line 23 for recycle to the dryer 10 to form the moving bed 14.

The following examples are given to illustrate preferred embodiments of the invention. It will be appreciated this invention is not limited to these examples.

In the first two examples, the moving bed is produced by feeding light soda ash of commerce having a density of 550 g.p.l. and a particle size such that about 12.5% passes through 30 mesh but is retained on 80 mesh; 11% passes through 80 mesh but is retained on 100 mesh; and 46% passes through 100 mesh but is retained on 200 mesh. In all examples 50% sodium hydroxide cell liquor is employed. The thickness of the bed is approximately 2 inches. It is produced in a stainless steel drum of the type shown in the drawing, heated externally and rotated by a motor to give a peripheral speed of 125 lineal feet per minute.

*Example I*

This example involves the feed of 2.47 pounds of 50% sodium hydroxide solution per cubic foot of drum volume per hour with 0.134 cubic feet of carbon dioxide and 1.22 cubic feet of air per minute per cubic foot of drum volume, countercurrent to the direction of movement of the bed. The feed forming the bed is equivalent to 1.64 pounds of sodium carbonate per cubic foot of drum volume per hour. The temperature of the bed of soda ash particles is within the range of from 90° to 100° C. in the section where the sodium hydroxide solution is introduced and about 190° C. at the discharge end. The run is continued for 2½ hours. A soda ash product is obtained having a density of about 1160 g.p.l.

*Example II*

This example differs from Example I chiefly in that the temperature of the moving bed in the section where the sodium hydroxide is introduced is maintained at 105–115° C., the feed rate of 50% NaOH is 7.48 pounds per hour per cubic foot of drum volume and 0.40 cubic feet of $CO_2$ per minute per cubic foot of drum volume is used. The feed forming the bed is equivalent to 4.95 pounds of sodium carbonate per cubic foot of drum volume per hour. A soda ash product having a density of 1080 g.p.l. is thus obtained. The minus 20 mesh product has the following mesh analysis:

| | Percent |
|---|---|
| Passing through 20 but retained on 30 | 0.4 |
| Passing through 30 but retained on 80 | 10.0 |
| Passing through 80 but retained on 100 | 11.2 |
| Passing through 100 but retained on 200 | 52.3 |
| Passing through 200 | 26.1 |

*Example III*

In this example the relatively small particles of soda ash separated from the sodium carbonate product are withdrawn and recycled to form the moving bed. Approximately 4.95 pounds of sodium carbonate per cubic foot of drum space per hour are thus recycled to form the moving bed. 7.48 pounds of 40% sodium hydroxide solution per hour per cubic foot of drum space are sprayed onto this moving bed. 0.40 cubic feet of carbon dioxide per minute per cubic foot of drum space are passed over the bed countercurrent to the flow of the moving bed which is maintained at a temperature of 105–115° C. in the spray section. There is thus obtained a soda ash product having a density of 1240 g.p.l. The screen analysis of the minus 20 mesh product is as follows:

| | Percent |
|---|---|
| Passing through 20 but retained on 30 | 0.9 |
| Passing through 30 but retained on 80 | 27.7 |
| Passing through 80 but retained on 100 | 23.5 |
| Passing through 100 but retained on 200 | 46.0 |
| Passing through 200 | 1.9 |

*Example IV*

This example differs from Example III in that 15.0 pounds of 50% sodium hydroxide solution are sprayed per hour per cubic foot of drum space and the amount of carbon dioxide per minute per cubic foot of drum space passed over the moving bed is 0.72 cubic feet. The feed rate of the recycled sodium carbonate forming the moving bed 9.9 pounds per cubic foot of drum space per hour. There is thus obtained a dense soda ash having a density of 1214 g.p.l. The screen analysis of the resultant minus 20 mesh product is as follows:

| | Percent |
|---|---|
| Passing through 20 but retained on 30 | 1.8 |
| Passing through 30 but retained on 80 | 39.5 |
| Passing through 80 but retained on 100 | 20.1 |
| Passing through 100 but retained on 200 | 36.9 |
| Passing through 200 | 1.7 |

It will be noted that the present invention provides a process of converting sodium hydroxide solutions of sodium carbonate, which process can be carried out in relatively simple equipment requiring less capital expenditure than that employed in procedures heretofore proposed for effecting such conversion and which process results in a soda ash product of high bulk density, good flow quality characteristics and suitable for use in the glass and other industries requiring or employing dense soda ash.

Since certain changes can be made in the process herein disclosed for converting sodium hydroxide solutions to sodium carbonate without departing from the scope of this invention, it is intended that all matter contained in the above description or shown in the accompanying drawing be interpreted as illustrative and not in a limiting sense.

What is claimed is:

1. A process of converting aqueous sodium hydroxide solutions to anhydrous sodium carbonate of high bulk density, which process comprises establishing a moving bed of finely divided particles of soda ash flowing from the inlet to the exit end of a confined zone, maintaining said moving bed at a temperature within the range of from 90° C. to 135° C., continuously feeding onto the inlet end of said moving bed the solution of sodium hydroxide while continuously passing over said moving bed a stream of carbon dioxide in amount at least equal to the stoichiometric amount required to convert the sodium hydroxide introduced onto said moving bed to sodium carbonate, and continuously removing the sodium carbonate thus produced from said confined zone at the exit end thereof.

2. A process of converting aqueous sodium hydroxide solutions to anhydrous sodium carbonate of high bulk density, which process comprises establishing a moving bed of finely divided particles of soda ash flowing from the inlet to the exit end of a confined zone, maintaining said moving bed at a temperature within the range of from 90° C. to 135° C., at said inlet end and at a temperature within the range of 160° C. to 190° C. at said exit end, continuously feeding onto the inlet end of said moving bed the solution of sodium hydroxide while continuously passing over said moving bed a stream of carbon dioxide in amount at least equal to the stiochiometric amount required to convert the sodium hydroxide introduced onto said moving bed to sodium carbonate, and continuously removing the sodium carbonate thus produced from said confined zone at the exit end thereof.

3. The process of claim 2 in which said confined zone is defined by a rotating drum and the moving bed is formed on the inner periphery of said drum.

4. The process of converting aqueous sodium hydroxide solutions having a concentration of from 30% to 70% by weight of sodium hydroxide to anhydrous sodium carbonate of high bulk density, which process comprises establishing a moving bed of finely divided particles of soda ash in a confined zone by flowing a stream of soda ash particles from the inlet to the exit end of said zone; spraying the solution of sodium hydroxide onto said moving bed of said sodium carbonate particles at the inlet end of said zone; maintaining said moving bed at a temperature within the range of from 90° C. to 135° C. at the inlet end of said zone and at a temperature within the range of 160° C. to 190° C. at the exit end of said zone; passing a stream of carbon dioxide over said moving bed flowing in a direction countercurrent to the direction of movement of said bed, the amount of carbon dioxide thus introduced being at least equal to the stoichiometric amount required to react with all of the sodium hydroxide sprayed onto said moving bed to convert the sodium hydroxide to sodium carbonate, and removing at the exit end of said zone the particles of sodium carbonate including that produced by the reaction of sodium hydroxide with the carbon dioxide.

5. The process of converting aqueous sodium hydroxide solutions having a concentration of from 30% to 70% by weight of sodium hydroxide to anhydrous dense sodium carbonate, which process comprises establishing a rotating bed of finely divided particles of soda ash in a rotary drum by introducing a stream of soda ash particles at the inlet end of said drum, flowing the particles over the interior of the rotating drum, and withdrawing soda ash particles from the exit end of said drum; spraying the solution of sodium hydroxide onto said moving bed of said sodium carbonate particles at the inlet end of said drum; maintaining said moving bed at a temperature within the range of from 90° C. to 135° C. at the inlet end of said drum and at a temperature within the range of 160° C. to 190° C. at the exit end of said drum; passing a stream of carbon dioxide containing from 10% to 100% by volume of carbon dioxide over said moving bed flowing in a direction countercurrent to the direction of movement of said bed, the amount of carbon dioxide thus introduced being at least equal to the stoichiometric amount required to react with all of the sodium hydroxide sprayed onto said moving bed to convert the sodium hydroxide to anhydrous sodium carbonate; removing at the exit end of said drum the particles of anhydrous sodium carbonate including that porduced by the reaction of sodium hydroxide with the carbon dioxide; separating the coarser particles from the remainder of the particles; separating fine particles from said remainder and removing as product the finely divided particles of anhydrous sodium carbonate remaining after separation of said fine particles; grinding the coarser particles, mixing the ground coarser particles with said finer particles and recycling the resultant mixture through said drum to form the moving rotating bed of sodium carbonate particles onto which the sodium hydroxide solution is sprayed.

6. The process of converting sodium hydroxide solutions to sodium carbonate of claim 5 in which the carbon dioxide is admixed with inert gas to form a stream containing from 10% to 90% by volume of inert gas and the rest carbon dioxide.

References Cited by the Examiner

UNITED STATES PATENTS

| 1,583,663 | 5/1926 | Sundstrom et al. | 23—63 |
| 2,459,414 | 1/1949 | Carrier | 23—63 |
| 3,202,477 | 8/1965 | Loeffler et al. | 23—63 |
| 3,212,848 | 10/1965 | Tasiaux | 23—63 |

FOREIGN PATENTS

| 776,331 | 6/1957 | Great Britain. |

OSCAR R. VERTIZ, *Primary Examiner.*

MILTON WEISSMAN, *Examiner.*

G. T. OZAKI, *Assistant Examiner.*